United States Patent Office 3,385,821
Patented May 28, 1968

3,385,821
ORGANOPOLYSILOXANES SUBSTITUTED WITH
TRIALKYLSILYLPHENYL SUBSTITUENTS
Tse C. Wu, 9 Clemente Lane,
Waterford, N.Y. 12188
No Drawing. Filed Nov. 21, 1966, Ser. No. 595,632
13 Claims. (Cl. 260—46.5)

ABSTRACT OF THE DISCLOSURE

High molecular weight organopolysiloxanes of improved flexibility have the average formula:

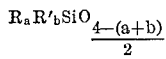

where R is a particular type of trialkylsilylphenyl group and R' represents a member selected from the class consisting of monovalent aryl groups and trialkylsilylphenyl groups, $a$ is from 0.33 to 2, $b$ is from 0 to 1.67, and the sum of $a$ plus $b$ is from 1.98 to 2.01.

---

This invention relates to high molecular weight organopolysiloxanes substituted with trialkylsilylphenyl substituents. More particularly, this invention relates to high molecular weight organopolysiloxanes having the average formula:

(1)  

where R is a trialkylsilylphenyl group having a formula selected from the class consisting of:

(2) 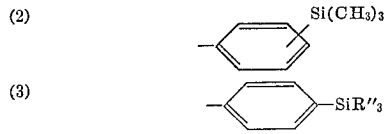

(3)

and (4) 

where R'' is a member selected from the class consisting of ethyl and propyl, R' is selected from the class consisting of monovalent aryl groups and trialkylsilylphenyl groups as defined for R, $a$ is from 0.33 to 2, $b$ is from 0 to 1.67, and the sum of $a$ and $b$ is from 1.98 to 2.01. Further, this invention relates to copolymeric materials containing from 0.1 to 99.9 percent of portions having the average formula:

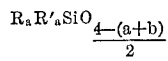

and from 99.9 to 0.1 percent of portions having the average formula:

(5)  $R'''_m SiO_{\frac{4-m}{2}}$ where R, R', $a$ and $b$ are as previously defined, R''' is selected from the class consisting of monovalent lower alkyl and monovalent aryl groups, no more than 10 percent of the total of R, R' and R''' being lower alkyl, and $m$ is from 1 to 3.

Aryl-substituted organopolysiloxanes are known to have greater high temperature stability and radiation resistance than the corresponding alkyl-substituted organopolysiloxanes. However, phenyl-substituted organopolysiloxanes, while having the high temperature and radiation resistance properties ascribed to aryl-substituted organopolysiloxanes, are generally brittle. Chiefly, this brittleness is believed due to the symmetry of the phenyl substitution. If the symmetry is broken by the inclusion of other substituents, the compounds become more flexible. However, if these other substituents are alkyl, then the full effect of the high temperature and radiation resistance properties of the phenyl-substituted compounds is not realized. If the symmetry is broken by the inclusion of another aryl substituent, not only is the compound less brittle, but, additionally, the high temperature and radiation resistance properties can be realized.

Previously, aryl-substituted organopolysiloxanes have been formed with tolyl and trifluoromethylphenylsubstituents. These polymers had the desired high temperature and radiation resistance properties and were entirely adequate for most uses. However, the polymers containing tolyl groups were subject to cross-linking if heated in the air for a sufficient period of time. The polymers containing the m-trifluoromethylphenyl groups, while not subject to cross-linking, had a tendency to de-polymerize upon continued heating.

In contradistinction to these prior aryl-substituted polymers, I have unexpectedly discovered that polymers substituted with trialkylsilylphenyl groups not only retain the high temperature and radiation resistance properties of aryl polysiloxanes, generally, but, in addition, are flexible, stable when heated in the air, and, in fact, have high temperature stability properties equivalent to those of polytetrafluoroethylene. Further, copolymers can be prepared employing organopolysiloxanes substituted with other aryl groups, such as, for example, phenyl or tolyl, in addition to the trialkylsilylphenyl-substituted units, without seriously affecting the flexibility or the thermal stability. In fact, up to 10 percent of the total organic substituents on the organopolysiloxane can be alkyl, without a significant impairment of the high temperature properties.

The polymers of the present invention are formed by the polymerization of cyclopolysiloxanes, particularly cyclotrisiloxanes substituted with trialkylsilylphenyl groups. The polymerization can be either a homopolymerization, involving a cyclopolysiloxane, particularly a cyclotrisiloxane, substituted either completely or partially with trialkylsilylphenyl groups, or it can involve a copolymerization between such a cyclotrisiloxane and a cyclopolysiloxane substituted with aryl groups or, as previously mentioned, with alkyl groups up to a total of 10 percent of the total substituents.

The cyclopolysiloxanes which are involved in a copolymerization are those described in my copending application, Ser. No. 595,631, filed of even date herewith, and assigned to the same assignee as the present invention. These cyclotrisiloxanes have the formula:

(6) 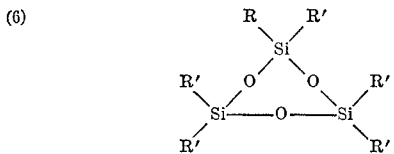

where R and R' are as previously defined. Copolymerized materials are formed by polymerizing a material of Formula 6 with a cyclopolysiloxane of formula:

(7)  

where R''' is as previously defined and $n$ is an integral number of from 3 to 10. Included within the definitions of the cyclopolysiloxane of Formula 6 are, for example, hexakis(m-trimethylsilylphenyl)cyclotrisiloxane,
hexakis(p-trimethylsilylphenyl)cyclotrisiloxane,
2,2-diphenyl-4,4,6,6-tetrakis(m-trimethylsilylphenyl)
  cyclotrisiloxane, 2,2-bis(m-trimethylsilylphenyl)tetraphenylcyclotrisiloxane,
2,2-bis(p-trimethylsilylphenyl)tetraphenylcyclotrisiloxane,
2,4,6-triphenyl-2,4,6-tris(m-triethylsilylphenyl)cyclotrisiloxane,
2-phenyl-2-(o-trimethylsilylphenyl)-4,4,6,6-tetratolylcyclotrisiloxane,
2-phenyl-2-(p-tripropylsilylphenyl)-4,4,6,6-tetrakis(m-trimethylsilylphenyl)cyclotrisiloxane, and
2,2-ditolyl-4,4,6,6-tetrakis(m-triethylsilylphenyl)cyclotrisiloxane Among the materials included within Formula 7 are hexaphenylcyclotrisiloxane, hexamethylcyclotrisiloxane, octamethylcyclotetrasiloxane, decamethylcyclopentasiloxane, hexatolylcyclotrisiloxane, and other, higher molecular weight cyclopolysiloxanes, or such cyclopolysiloxanes having mixed substituents within the general definition of $R'''$.

When cyclic polysiloxanes having alkyl groups are employed, the resulting polymer film has greater flexibility than when employing purely aryl groups or the trialkylsilylphenyl groups of the present invention, but a certain amount of the heat stability is sacrificed. However, as previously mentioned, the inclusion of up to 10 percent alkyl groups on the in-chain silicon atoms does not present a sufficient impairment of the heat stability properties to be problematical. Preferably, the high molecular weight organopolysiloxane substituted with trialkylsilylphenyl groups, formed by either the homopolymerization or the copolymerization, should have an intrinsic viscosity of at least 1.0. When the intrinsic viscosity is below this figure of 1.0, the films which are formed from the polymer generally do not have sufficient strength to be practically useful.

In order to produce a cross-linkable polymer either with the aforementioned homopolymer or copolymer, the cyclotrisiloxane of Formula 6, with or without the material of Formula 7, should be copolymerized with organopolysiloxanes containing vinyl substitutents on the chain silicon atoms, such as materials of formula:

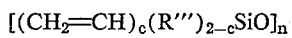

where $R'''$ and $n$ are as previously defined, and $c$ is from 0.33 to 1.0. For example, 2-methyl-2-vinyl-4,4,6,6-tetraphenylcyclotrisiloxane can be employed, as can other vinyl-substituted organopolysiloxanes, either cyclic or straight chain materials. The amount of material containing silicon-substituted vinyl members should be in the range of from 0.5 to 5 percent, and preferably about 3 percent when employing a material such as the aforementioned 2-methyl - 2- vinyl -4,4,6,6-tetraphenylcyclotrisiloxane. In the copolymer, these materials have the average formula:

(9)

where $R'''$ and $c$ are as previously defined. The vinyl-substituted materials are especially useful in the formation of a film by cross-linking and do not significantly affect the heat stability of the resultant polymer.

The process for forming the high molecular weight organopolysiloxanes substituted with trialkylsilylphenyl groups, according to the present invention, is the same whether it is a homopolymerization or a copolymerization. The polymerization can be accomplished in the presence or in the absence of a solvent. The cyclotrisiloxanes to be polymerized should be present in amounts varying from 20 to 100 percent of the total polymerization mixture and the solvent in an amount of from about 80 percent to 0 percent of the total polymerization mixture. If a solvent is employed, it should be an aliphatic hydrocarbon solvent having from about 6 to 16 carbon atoms, or from about hexane to hexadecane in the paraffin series. The requirements are that the boiling point of the solvent not be so low that it is boiled away prior to completion of polymerization and that the melting point be sufficiently low that the solvent is a liquid at about room temperature.

The polymerization is generally conducted at a temperature of about 110° C., when using a low boiling solvent. When a higher boiling solvent is employed, or when no solvent is used for the polymerization, the temperature can vary from 110° C. up to about 40–50° C. above the melting point of the cyclotrisiloxane to be polymerized, or about 40–50° C. above the melting point of the highest melting of the cyclopolysiloxanes used in a copolymerization. After the polymerization mixture is brought to the desired temperature, a quantity of catalyst is added. In general, any strong basic catalyst can be employed, particularly potassium naphthalene or potassium hydroxide suspended in an organopolysiloxane, such as octamethylcyclotetrasiloxane. In general, an amount of catalyst between about 20 and 200 parts per million of equivalent potassium hydroxide should be used. The amount of catalyst, so long as it is above the minimum, does not affect the molecular weight of the ultimately formed organopolysiloxane. Following addition of the catalyst, the polymerization mixture, which is stirred from a time at least just prior to the addition of the catalyst, increases very rapidly in viscosity and, often, the viscosity increases sufficiently to prevent movement of the stirrer within only a few seconds. However, heating of the polymerization mixture is continued for from about 3 to 30 minutes in order to assure completion of polymerization.

After this heating is completed, the polymer must be decatalyzed in order to prevent depolymerization of the formed material. Among the materials which can be employed to effect this decatalysis are benzyl chloride, methyl iodide, allyl bromide, and trimethylchlorosilane. The amount of decatalyzer used should be in the range of from about 100 to 1000 parts per million, based upon the original cyclopolysiloxanes. The decatalysis agent is added to a solvent solution of the polymerization mixture or can be added with a solvent if the polymer was prepared without solvent, and the solution is stirred for a sufficient time to assure that there is an essentially complete blending. The solvent is then removed, by heating, and the material is ready for use.

The formation of the high molecular weight organopolysiloxane substituted with trialkylsilylphenyl groups will now be described in greater detail. These examples should be considered as illustrative only, and not as limiting in any way the full scope of the invention as covered in the appended claims. All parts are by weight.

Examples 1–6

In these examples, the homopolymerization of a material having the formula:

(10)
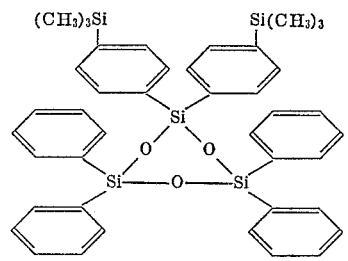

is illustrated. This material corresponds to Formula 6 where R and the R′ substituent on the corresponding silicon atom are as shown in Formula 2 with the trimethylsilyl group in the para position and the remaining R′ groups are phenyl. In some cases, the cyclotrisiloxane of Formula 10 was copolymerized with 2-methyl-2-vinyl-4,4,6,6-tetraphenylcyclotrisiloxane. In the table below are listed the reaction conditions and results, with the vinyl-substituted cyclotrisiloxane being designated as A in those examples where it was employed. In the table "Percent Polysiloxane" indicates the concentration of the cyclotrisiloxanes in the total polymerization mixture, "Induction Time" indicates the time until the stirrer stopped because of the increased viscosity of the polymerization mixture, "Additional Heating Time" indicates the number of minutes for which heating was continued after the stirrer stopped, and "Intrinsic Viscosity" indicates the molecular weight of the finally formed polymer in deciliters per gram.

which correspond to Formula 9 where R''' is methyl and phenyl, and c is 0.33.

Films which were cast with each of these polymers from a chloroform solution, were clear, transparent, and flexible. Additionally, fibers were formable from the polymers employing either melt spinning or wet spinning. The polymer of Example 4, when press-cured at 150° C. under a pressure of 100000 lbs., employing about 0.5 percent of dicumyl peroxide as a catalyst, produced a film having a tensile strength of 1800 p.s.i. at an elongation of

TABLE I

| Example | Solvent | Percent Polysiloxane | Copolymerized Materials | Bath Temperature (°C.) | Catalyst | Induction Time (seconds) | Additional Heating Time (minutes) | Intrinsic Viscosity (dl./g.) |
|---|---|---|---|---|---|---|---|---|
| 1 | None | 100 | None | 150 | Sodium naphthalene | 104 | 15 | 3.18 |
| 2 | do | 100 | do | 150 | Potassium naphthalene | 2 | 15 | 3.06 |
| 3 | do | 100 | do | 150 | do | 1 | 10 | 1.81 |
| 4 | Hexane | 27 | do | 110 | do | 120 | 10 | 3.98 |
| 5 | None | 100 | 3% A | 150 | do | 2 | 15 | 3.59 |
| 6 | do | 75 | 3% A | 110 | do | 35 | 10 | 4.62 |

In each case the cyclotrisiloxane, and the solvent, when employed, were placed in a reaction vessel which was heated, while stirring the polymerization mixture, until the trimer melted. A vacuum was then applied to remove traces of volatile impurities, such as any of the solvents employed for recrystallization which remained in the trimers. Nitrogen was introduced into the reaction vessel in order to release the vacuum and an amount of the stated catalyst, dissolved in tetrahydrofuran, equivalent to 40 p.p.m. of potassium hydroxide, based upon the total cyclopolysiloxane employed, was then added. Heating was continued until the stirrer stopped due to the increased viscosity and then for an additional time, as indicated. The polymer was then dissolved in toluene containing about 200 parts per million of triethylphosphate, based upon the original cyclotrisiloxanes, to neutralize the catalyst employed, and the polymer was then reprecipitated with hexane, so as to remove the low molecular weight fractions. The resulting polymer was redissolved in toluene, filtered, and dried. The intrinsic viscosity determination was conducted at 25° C.

Thus, it can be seen that employing a variety of conditions, as set forth in the general description of the process, a polymer is formed in Examples 1–4 having the average formula:

(11)
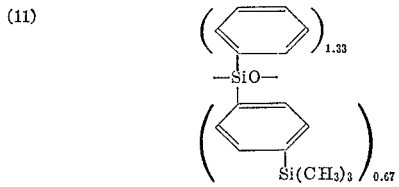

which corresponds to Formula 1 where R is as shown in Formula 2 with the trimethylsilyl group in the para position, R' is phenyl, a is 0.67, and b is 1.33. Similarly, in Examples 5 and 6 a copolymer is formed having 97 percent portions of average Formula 11 and 3 percent portions of average formula:

(12)
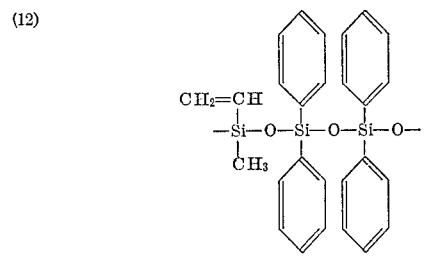

140 percent. A post cure of this film for 2 hours at 200° C. resulted in a film with a tensile strength of 4200 p.s.i. and, essentially, no elongation.

When heated in air, in the absence of a cross-linking catalyst, there was no cross-linking of the polymer as had been experienced in the case of the tolyl-substituted organopolysiloxanes. A thermal gravimetric analysis was performed on the polymer of Example 1. When this polymer was heated in dry air at 480° C., it lost about 10 percent of its weight per hour. This rate of loss is essentially equivalent to that of polytetrafluoroethylene and is much better than that of most organopolysiloxanes. By contrast, a dimethylpolysiloxane loses about 10 percent of its weight when heated in dry air at only 350° C.

Further the polymers of the present invention exhibit exceptional reversion resistance. A portion of a film made from the polymer of Example 4 was placed in water within a sealed tube. The tube and its contents were heated at 175° C. for a period of 48 hours. After this period the film was removed and was found to be essentially unchanged in appearance.

Examples 7–15

In this series of examples, polymers were prepared from 2,2-bis(m-trimethylsilylphenyl)-4,4,6,6 - tetraphenylcyclotrisiloxane of formula:

(13)
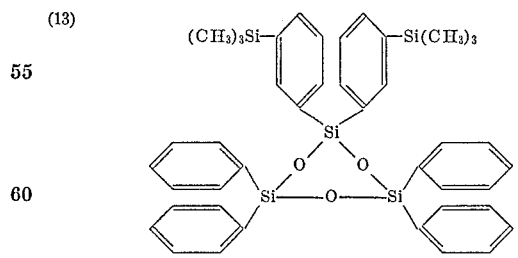

which corresponds to Formula 6 where R and the R' substituent on the corresponding silicon atom are as shown in Formula 2 with the trimethylsilyl group in the meta position, and each of the other R' substituents is phenyl. In each case, the above-mentioned cyclotrisiloxane was copolymerized with 2-methyl-2-vinyl-4,4,6,6-tetraphenylcyclotrisiloxane in an amount of 3 percent. The procedure was the same as that for the polymers of Examples 1–6, employing potassium naphthalene, in an amount equivalent to 40 p.p.m. as potassium hydroxide, based on the polysiloxane, as the catalyst in each example. The conditions of reaction and results are shown in Table II, with the same designations as in Table I:

TABLE II

| Example | Solvent | Percent Polysiloxane | Bath Temperature (° C.) | Induction Time (seconds) | Additional Heating Time (minutes) | Intrinsic Viscosity (dl./g.) |
|---|---|---|---|---|---|---|
| 7 | None | 100 | 120 | 7 | 15 | 1.42 |
| 8 | do | 100 | 120 | 14 | 15 | 1.14 |
| 9 | do | 75 | 155 | 2 | 15 | 1.03 |
| 10 | Hexane | 75 | 110 | 18 | 10 | 2.59 |
| 11 | Heptane | 75 | 110 | 17 | 10 | 3.60 |
| 12 | Hexane | 75 | 110 | 35 | 10 | 2.86 |
| 13 | do | 75 | 110 | 27 | 10 | 3.00 |
| 14 | do | 70 | 110 | 40 | 15 | 4.74 |
| 15 | do | 67 | 110 | 8 | 15 | 4.79 |

The resulting copolymers consisted of 97 percent portions of average formula:

(14)

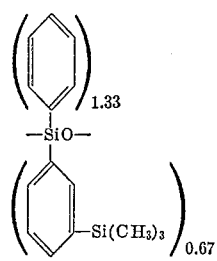

corresponding to Formula 1 where R is as shown in Formula 2 with the trimethylsilyl group in the meta position, R' is phenyl, $a$ is 0.67, and $b$ is 1.33; and 3 percent of the portions of average formula:

(12)

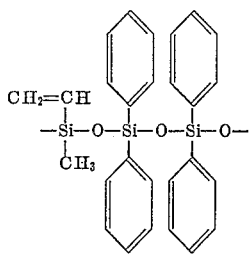

which corresponds to Formula 9 as described for Examples 1–6.

Films could be formed from the polymers just described, as with those formed with the cyclotrisiloxane substituted with p-trimethylsilylphenyl groups. However, the films formed with the polymers in this series of examples were somewhat softer than those formed from the polymers of the preceding examples. Again, films cast from chloroform solutions were clear, transparent, and flexible, and fibers could be formed from the polymers by either melt or wet spinning. The polymer of Example 10 was treated with about 0.5 percent dicumyl peroxide and was then press-cured at 150° C. and 1000 p.s.i. for 15 minutes. The resulting film showed a tensile strength of 710 p.s.i. and an elongation of 180 percent. Post curing of this film for 2 hours at 200° C. resulted in a film having a tensile strength of 2300 p.s.i. with essentially no elongation.

The polymer of Example 15 was subjected to the reversion resistance test as previously described for the polymer of Example 4. Again, after heating for 48 hours at 175° C., the film removed from the sealed tube was essentially unchanged in appearance.

Examples 16–17

Two polymers were formed from hexakis(p-trimethylsilylphenyl)cyclotrisiloxane of formula:

(15)

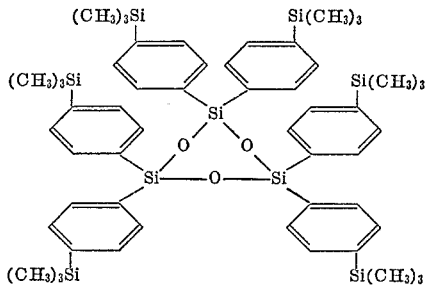

which corresponds to Formula 6 where R and each R' substituent are as shown in Formula 2 with the trimethylsilyl group in the para position. The polymerization procedures were the same as those employed for Examples 1–6, using potassium naphthalene, in an amount equivalent to 40 p.p.m. as potassium hydroxide based on the polysiloxane, as the catalyst in each example. In each of the examples, the material was homopolymerized and the conditions of reaction and results are as shown in Table III, employing the same designations as in Table I:

TABLE III

| Example | Solvent | Percent Polysiloxane | Bath Temperature (° C.) | Induction Time (seconds) | Additional Heating Time (minutes) | Intrinsic Viscosity (dl./g.) |
|---|---|---|---|---|---|---|
| 16 | Heptane | 37.5 | 110 | 90 | 15 | 1.36 |
| 17 | None | 100 | 225 |  | 3 | 1.21 |

The resulting polymers thus had recurring units of formula:

(16)

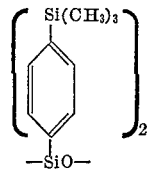

corresponding to Formula 1 where R is as shown in Formula 2 with the trimethylsilyl group in the para position, $a$ is 2, and $b$ is 0.

Example 18

In this example hexakis(m-trimethylsilylphenyl)cyclotrisiloxane was homopolymerized, the cyclic material having the formula:

(17)
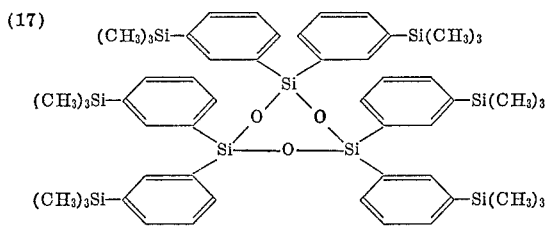

corresponding to Formula 6 where R and each R' are as shown in Formula 2 with the trimethylsilyl group in the meta position. This material was heated in hexane, in a concentration of 37.5 percent, at a temperature of 110° C. in the presence of a quantity of potassium naphthalene equivalent to 40 p.p.m. of potassium hydroxide based on the polysiloxane. The material increased in viscosity sufficiently to stop the stirrer in 11 seconds, but heating was continued for an additional 10 minutes, resulting in a polymer having, after recovery as in Examples 1–6, an intrinsic viscosity of 2.97 dl./g. with recurring units of formula:

(18)
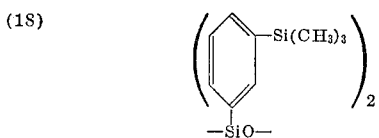

corresponding to Formula 1 where R is as shown in Formula 2 with the trimethylsilyl group in the meta position, $a$ is 2, and $b$ is 0.

Examples 19–21

In this series of examples, 2,2-diphenyl-4,4,6,6-tetrakis (m-trimethylsilylphenyl)cyclotrisiloxane, of formula:

(19)
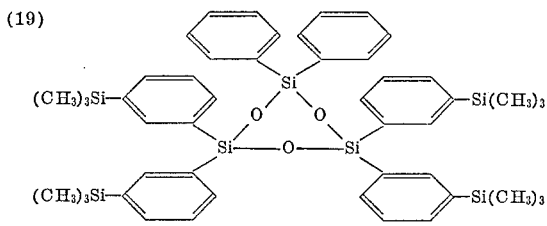

was copolymerized with 3 percent 2-methyl-2-vinyl-4,4,6,6-tetraphenylcyclotrisiloxane. The material of Formula 19 corresponds to that of Formula 6 where R, the R' substituent on the corresponding silicon atom, and two R' substituents on a second silicon atom are as shown in Formula 2 with the trimethylsilyl group in the meta position, and the remaining R' substituents are phenyl. The polymerization procedures were the same as those employed for Examples 1–6. In each example the polymerization was carried out in hexane, with a polysiloxane content in the solution of 75 percent, at a temperature of 110° C., employing potassium naphthalene, in an amount equivalent to 40 p.p.m. of potassium hydroxide based on the cyclopolysiloxane, as the catalyst. The conditions of reaction and results are as shown in Table IV, employing the same designations as in Table I:

TABLE IV

| Example | Induction Time (Seconds) | Additional Heating Time (Minutes) | Intrinsic Viscosity (dl./g.) |
|---|---|---|---|
| 19 | 67 | 10 | 1.10 |
| 20 | 63 | 10 | 1.18 |
| 21 | 149 | 10 | 1.42 |

Thus, each of the polymers produced according to these examples contained 97 percent portions of average formula:

(20)
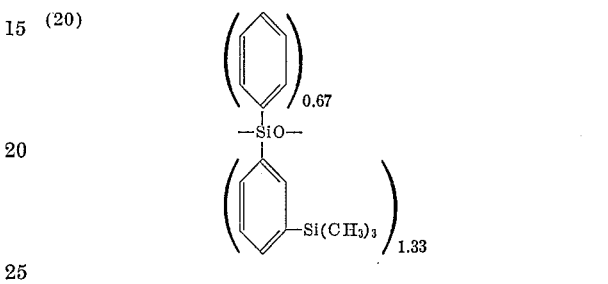

corresponding to Formula 1 where R is as shown in Formula 2 with the trimethylsilyl group in the meta position, R' is phenyl, $a$ is 1.33 and $b$ is 0.67; and 3 percent portions of Formula 12.

Films cast from chloroform solutions of each of these formulas were clear, transparent, and flexible. The polymers were tough, but pliable solids. Again, fibers could be formed from the polymers either by melt spinning or by wet spinning. The polymers did not cross-link when heated in the air, in the absence of cross-linking catalysts, and the films were reversion resistant.

Examples 22–24

In this series of examples, equimolar amounts of 2,2-bis(m - trimethylsilylphenyl) - 4,4,6,6 - tetraphenylcyclotrisiloxane of Formula 13 and 2,2 - bis(p - trimethylsilylphenyl)-4,4,6,6-tetraphenylcyclotrisiloxane of Formula 10 were copolymerized with a quantity of 3 percent, based on the total of the two trimethylsilylphenyl-substituted cyclotrisiloxanes, of 2-methyl-2-vinyl-4,4,6,6-tetraphenylcyclotrisiloxane. The polymerization procedures were the same as those employed in Examples 1–6, employing the catalyst as in Examples 7–15. The conditions of reaction and results are as shown in Table V, with the same designations as in Table I:

TABLE V

| Example | Solvent | Percent Polysiloxane | Bath Temperature (° C.) | Induction Time (seconds) | Additional Heating Time (minutes) | Intrinsic Viscosity (dl./g.) |
|---|---|---|---|---|---|---|
| 22 | Heptane | 67 | 110 | 8 | 10 | 3.97 |
| 23 | Hexane | 63 | 110 | 14 | 10 | 4.40 |
| 24 | None | 100 | 130 | 5 | 10 | 1.02 |

As with the polymers of the preceding examples, films cast from the chloroform solutions were clear, transparent and flexible and were tough, but pliable. Each of the polymers could be formed into fibers either by melt spinning or by wet spinning.

The materials did not cross-link when heater in the air, except in the presence of a cross-linking catalyst. The polymer formed in Example 24 was press-cured, with about 0.5 percent dicumyl peroxide catalyst, for 15 minutes at 150° C. and 1000 p.s.i. The resulting film had a tensile strength of 3500 p.s.i. with an elongation of about 10 percent. These polymers were also heat stable and reversion resistant.

The polymers formed from the above copolymerizations contained about 48.5 percent units of Formula 14, 48.5 percent units of Formula 11 and 3 percent units of Formula 12 which correspond to the generic formulas as described in the previous examples.

Examples 25–26

In these examples equimolar quantities of 2,2-bis(m-trimethylsilylphenyl) - 4,4,6,6-tetraphenylcyclotrisiloxane of Formula 13 and 2-2-diphenyl-4,4,6,6-tetrakis(m-trimethylsilylphenyl)cyclotrisiloxane of Formula 19 were copolymerized with 3 percent, based on the total weight of the two, of 2-methyl-2-vinyl-4,4,6,6-tetraphenylcyclotrisiloxane. The polymerization procedures were the same as those employed in Examples 1–6. Each of the polymerizations was carried out in hexane, with a polysiloxane concentration of 75 percent, at a temperature of 110° C., using potassium naphthalene as the catalyst, in an amount equivalent to 40 p.p.m. of potassium hydroxide based on the polysiloxane. The conditions and results of the polymerization are recorded in Table VI, with the same designations as in Table I:

TABLE VI

| Example | Induction Time (seconds) | Additional Heating Time (minutes) | Intrinsic Viscosity (dl./g.) |
|---|---|---|---|
| 25 | 54 | 10 | 1.63 |
| 26 | 54 | 10 | 1.63 |
| 26 | 45 | 10 | 1.47 |

These polymers had about 48.5 percent units corresponding to Formula 14, about 48.5 percent units corresponding to Formula 20, and about 3 percent units corresponding to Formula 12, which correspond to the generic formulas as explained in previous examples.

Films formed from these materials were tough, but pliable, and films cast from chloroform solutions of the polymers were clear, transparent, and flexible. As with the polymers described in preceding examples, fibers could be formed from these polymers by melt or wet spinning. Additionally, the polymers had excellent heat stability and reversion resistance.

Example 27

In this example equimolar amounts of 2,2-(p-trimethylsilylphenyl) - 4,4,6,6 - tetraphenylcyclotrisiloxane of Formula 10 and of hexakis(p-trimethylsilylphenyl)cyclotrisiloxane of Formula 15 were copolymerized. The polymerization was conducted in the absence of a solvent at a temperature of about 180° C. with a quantity of potassium naphthalene equivalent to 40 p.p.m. of potassium hydroxide based on the polysiloxane. The viscosity of the polymerization mixture increased sufficiently to stop the stirrer in about 1 second. Heating was continued for an additional 5 minutes and, the polymer was recovered by the method described for Examples 1–6. It had an intrinsic viscosity of 1.15 dl./g. and had about 48.5 percent units of Formula 11, 48.5 percent units of Formula 16, and 3 percent units of Formula 12.

These polymers when heated in the air would not crosslink showing the heat stability of the trimethylsilylphenyl group.

Example 28

Employing the same general procedures and reaction conditions as used in Examples 7–15, a cyclotrisiloxane having the formula:

(21)
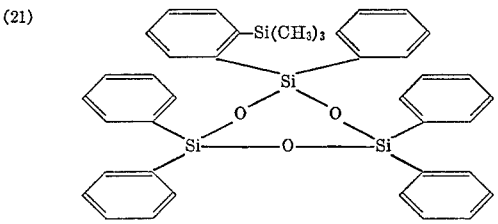

which corresponds to Formula 6 where R is as shown in Formula 2 with the trimethylsilyl group in the ortho position and each R' sustituent is phenyl, is homopolymerized. The resultant polymer has the average formula:

(22)
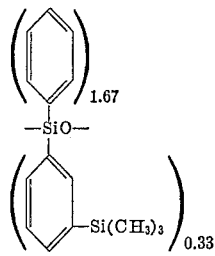

which corresponds to Formula 1 where R is as shown in Formula 2 with the trimethylsilyl group in the ortho position, R' is phenyl, $a$ is 0.33, and $b$ is 1.67.

Example 29

Employing the same general reaction conditions as described for Examples 25 and 26, a quantity of 3300 parts of trialkylsilylphenyl-substituted cyclotrisiloxane of formula:

(23)
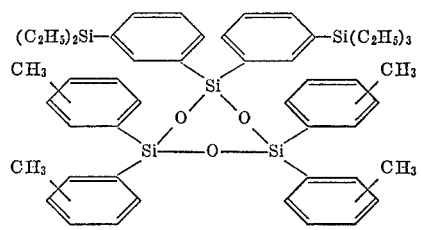

which corresponds to Formula 6 with R and the R' substituent on the corresponding silicon atom as shown in Formula 4 where each R" is ethyl, and the remaining R' substituents are tolyl; and 100 parts of octamethylcyclotetrasiloxane are copolymerized. The resulting copolymer is comprised of about 90 percent of portions of average formula:

(24)
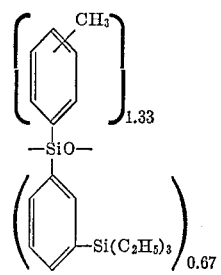

corresponding to Formula 1 with R as shown in Formula 4 where R" is ethyl, R' is tolyl, $a$ is 0.67, and $b$ is 1.33; and about 10 percent of units of the formula:

(25)

which corresponds to Formula 5 where R''' is methyl, and $m$ is 2.

Example 30

Following the general procedure and reaction conditions of Example 19, the following trialkylsilylphenyl-substituted cyclotrisiloxane is polymerized:

(26)
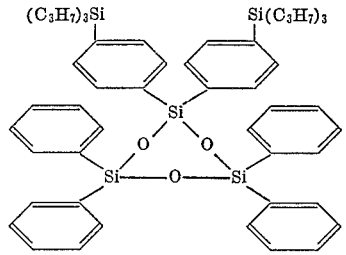

This corresponds to the material of Formula 6 with R and the R' substituent on the corresponding silicon atom as shown in Formula 3 where R'' is propyl, and the remaining R' substituents are phenyl. The resulting polymer has the average formula:

(27) 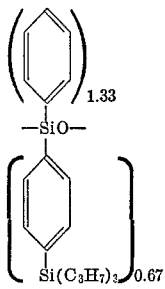

corresponding to Formula 1 with R as shown in Formula 3 where R'' is propyl, R' is phenyl, $a$ is 0.67, and $b$ is 1.33.

The polymers of the present invention are extremely useful in providing heat-resistant coatings on various materials. For example, mufflers and tailpipes of automobiles may be coated inside and out with solutions of these polymers, particularly those containing vinyl spbstituents where the solution also contains from about 0.1 to 10 percent dicumyl peroxide and the solvent evaporated to leave behind a heat-resistant and corrosion-resistant film which can increase the life of these automobile parts. Additionally, solutions of these compounds can be applied to ovens and ranges, the solvent evaporated to give, again, a heat-resistant surface which also minimizes the adhesion of many foodstuffs which may be inadvertently spilled on, or come in contact with, the treated oven or range surface.

While specific embodiments of the invention have been shown and described, the invention should not be limited to the particular methods of formation and compositions. It is intended, therefore, by the appended claims, to cover all modifications within the spirit and scope of this invention.

What I claim as new and desire to secure by Letters Patent of the United States is:

1. An organopolysiloxane consisting essentially of the average formula:

$$R_aR'_bSiO_{\frac{4-(a+b)}{2}}$$

where R is a trialkylsilylphenyl group selected from the class consisting of:

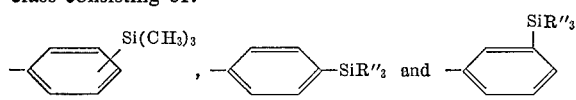

where R'' is a member selected from the class consisting of ethyl and propyl; R' is selected from the class consisting of monovalent aryl groups and trialkylsilylphenyl groups as defined for R, $a$ is from 0.33 to 2.0, $b$ is from 0 to 1.67, and the sum of $a$ and $b$ is from 1.98 to 2.01.

2. The organopolysiloxane of claim 1 consisting essentially of the average formula:

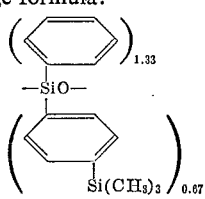

3. The organopolysiloxane of claim 1 consisting essentially of recurring units of the formula:

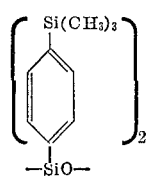

4. The organopolysiloxane of claim 1 having portions of the average formula:

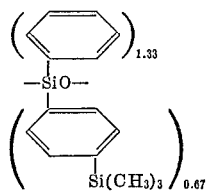

and of the average formula:

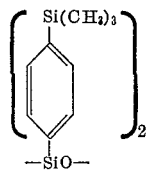

5. The organopolysiloxane of claim 1 having, in an amount of from 0.5 to 5.0 percent, units of formula:

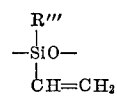

where R''' is selected from the class consisting of monovalent lower alkyl groups and monovalent aryl groups.

6. The organopolysiloxane of claim 5 having portions of average formula:

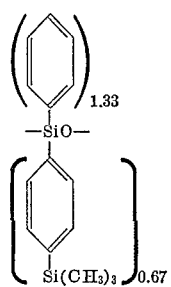

and of average formula:

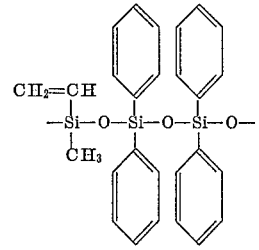

7. The organopolysiloxane of claim 5 having portions of the average formula:

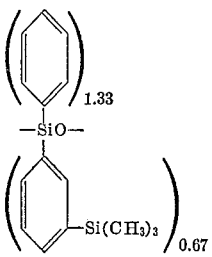

and of average formula:

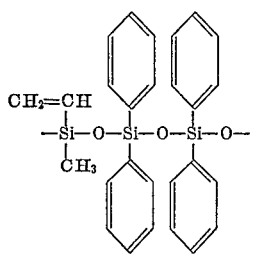

8. The organopolysiloxane of claim 5 having units of formula:

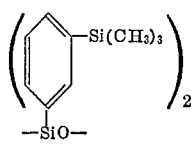

and

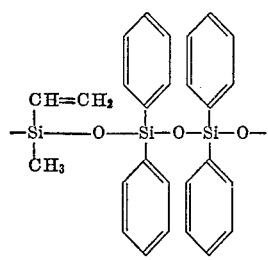

9. The organopolysiloxane of claim 5 having portions of average formula:

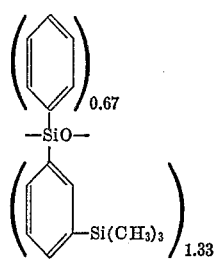

and of formula:

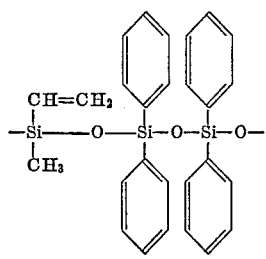

10. The organopolysiloxane of claim 5 having portions of average formulas:

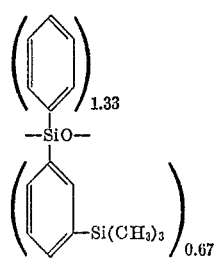

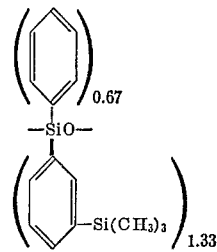

and

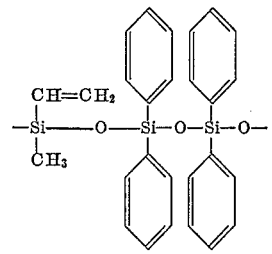

11. The organopolysiloxane of claim 5 having portions of average formulas:

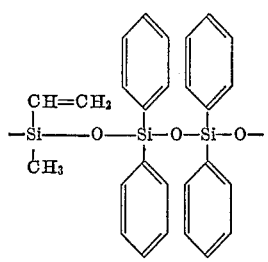

and

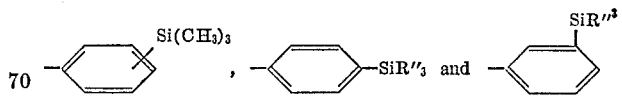

12. A copolymeric organopolysiloxane consisting essentially of from 0.1 to 99.9 percent portions of average formula:

$$R_aR'_bSiO_{\frac{4-(a+b)}{2}}$$

and from 99.9 to 0.1 percent portions of average formula:

$$R'''_mSiO_{\frac{4-m}{2}}$$

where R is a trialkylsilylphenyl group selected from the class consisting of:

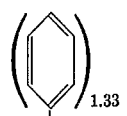 , 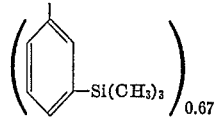 and 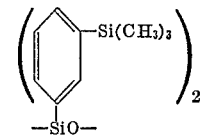

where R'' is a member selected from the class consisting of ethyl and propyl; R' is selected from the class consisting of monovalent aryl groups and trialkylsilylphenyl groups as defined for R, $a$ is from 0.33 to 2.0, $b$ is from 0 to 1.67, and the sum of $a$ and $b$ is from 1.98 to 2.01; $R'''$ is selected from the class consisting of monovalent aryl groups and monovalent lower alkyl groups, no more than 10 percent of the total R, R' and R''' substituents being lower alkyl, and $m$ is from 1 to 3.

13. The copolymeric organopolysiloxane of claim 12 having, in an amount of from 0.5 to 5 percent, units of formula:

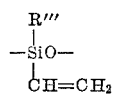

References Cited
UNITED STATES PATENTS

| 2,696,480 | 12/1954 | Gordon et al. | 260—46.5 |
| 3,234,180 | 2/1966 | Wu | 260—46.5 |
| 3,278,461 | 10/1966 | Wu | 260—46.5 |
| 3,325,530 | 6/1967 | Wu | 260—46.5 |

DONALD E. CZAJA, *Primary Examiner.*

M. I. MARQUIS, *Assistant Examiner.*

UNITED STATES PATENT OFFICE
CERTIFICATE OF CORRECTION

Patent No. 3,385,821　　　　　　　　　　　　　　　　May 28, 1968

Tse C. Wu

It is certified that error appears in the above identified patent and that said Letters Patent are hereby corrected as shown below:

In the heading to the printed specification, lines 4 and 5, "9 Clemente Lane, Waterford, N. Y. 12188" should read -- Waterford, N. Y., assignor to General Electric Company, a corporation of New York --.

Signed and sealed this 3rd day of February 1970.

(SEAL)
Attest:

Edward M. Fletcher, Jr.　　　　　　　　　　　WILLIAM E. SCHUYLER, JR.
Attesting Officer　　　　　　　　　　　　　　　　　Commissioner of Patents